(12) United States Patent
Sun et al.

(10) Patent No.: US 10,713,194 B2
(45) Date of Patent: *Jul. 14, 2020

(54) CALIBRATION ON HIGH-SPEED IO INTERFACES

(71) Applicant: International Business Machines Corporation, Armonk, NY (US)

(72) Inventors: Xu Guang Sun, Beijing (CN); Yang Xiao, Xian (CN); Xiao Di Xing, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,016

(22) Filed: Jul. 17, 2019

(65) Prior Publication Data

US 2020/0065272 A1 Feb. 27, 2020

Related U.S. Application Data

(63) Continuation of application No. 16/109,805, filed on Aug. 23, 2018, now Pat. No. 10,437,753.

(51) Int. Cl.
*G06F 13/20* (2006.01)
*G06F 13/40* (2006.01)

(52) U.S. Cl.
CPC .......... *G06F 13/20* (2013.01); *G06F 13/4068* (2013.01)

(58) Field of Classification Search
CPC ............................ G06F 13/20; G06F 13/4068
See application file for complete search history.

(56) References Cited

U.S. PATENT DOCUMENTS

| | | | |
|---|---|---|---|
| 6,484,232 B2 | 11/2002 | Olarig et al. | |
| 6,564,288 B2 | 5/2003 | Olarig et al. | |
| 7,072,355 B2 | 7/2006 | Kizer | |
| 10,437,753 B1* | 10/2019 | Sun | G06F 13/4068 |
| 2002/0066001 A1 | 5/2002 | Olarig et al. | |
| 2002/0066047 A1 | 5/2002 | Olarig et al. | |
| 2005/0041683 A1 | 2/2005 | Kizer | |
| 2014/0176198 A1* | 6/2014 | Friedman | H03K 19/0019 327/109 |
| 2016/0087733 A1 | 3/2016 | Kim et al. | |
| 2016/0239459 A1 | 8/2016 | Dickson et al. | |

OTHER PUBLICATIONS

Mell et al., "The NIST Definition of Cloud Computing", Recommendations of the National Institute of Standards and Technology, Sep. 2011, U.S. Department of Commerce, 7 pages.
IBM, List of IBM Patents or Patent Applications Treated as Related, Jul. 15, 2019, 2 pages.
Sun et al., "Calibration on High-Speed IO Interfaces", U.S. Appl. No. 16/109,805, filed Aug. 23, 2018.

* cited by examiner

*Primary Examiner* — Zachary K Huson
(74) *Attorney, Agent, or Firm* — Daniel C. Housley (57) ABSTRACT

Embodiments of the present disclosure relate to a computer-implemented method. According to the method, a series of valid control codes for a calibration stage in a channel corresponding to a plurality of calibration cycles are acquired from the calibration logic. The acquired valid control codes are analyzed to obtain changing characteristics for the calibration stage in the channel. The calibration logic for the calibration stage in the channel is adjusted in one or more subsequent calibration cycles based on the changing characteristics.

10 Claims, 7 Drawing Sheets

CALIBRATION ON HIGH-SPEED IO INTERFACES

BACKGROUND

The present disclosure relates to high-speed Input/Output (IO) interface communication and more specifically, to calibration on high-speed IO interfaces.

With the increasing complexity of integrated circuits, high-performance data processing applications are driving a demand for data transmission working in the gigahertz range. Simultaneously, a corresponding high-performance bus interface technology is being developed to meet the needs between processors and systems. Conventional interface speed increases may result in signal degradation caused by time dispersion, reflections, and undesired environment condition fluctuations.

SUMMARY

According to one embodiment of the present disclosure, there is provided a computer-implemented method for calibration on high-speed IO interfaces. According to the method, a series of valid control codes for a calibration stage in a channel corresponding to a plurality of calibration cycles is acquired from the calibration logic by one or more processing units. The acquired valid control codes are analyzed by one or more processing units to obtain changing characteristics for the calibration stage in the channel. The calibration logic for the calibration stage in the channel is adjusted by one or more processing units in the next one or more calibration cycles, according to the changing characteristics.

According to one embodiment of the present disclosure, there is provided a computer system for calibration on high-speed IO interfaces. The computer system comprises one or more processing units and a memory coupled to one or more processing units, where the memory comprises program instructions that when executed by the one or more processing units implements a method. According to the method, a series of valid control codes for a calibration stage in a channel corresponding to a plurality of calibration cycles is acquired from the calibration logic. The acquired valid control codes are analyzed to obtain changing characteristics for the calibration stage in the channel. The calibration logic for the calibration stage in the channel is adjusted in the next one or more calibration cycles according to the changing characteristics.

According to one embodiment of the present disclosure, there is provided a computer program product for calibration on high-speed IO interfaces. The computer program product comprises a computer readable storage medium having program instructions embodied therewith, the program instructions executable by a processor to cause the processor to perform a method. According to the method, a series of valid control codes for a calibration stage in a channel corresponding to a plurality of calibration cycles is acquired from the calibration logic. The acquired valid control codes are analyzed to obtain changing characteristics for the calibration stage in the channel. The calibration logic for the calibration stage in the channel is adjusted in the next one or more calibration cycles according to the changing characteristics.

BRIEF DESCRIPTION OF THE DRAWINGS

Through the more detailed description of some embodiments of the present disclosure in the accompanying drawings, the objects, features and advantages of the present disclosure will become more apparent. The same reference generally refers to the same components in the embodiments of the present disclosure.

DETAILED DESCRIPTION

Some preferable embodiments will be described in more detail with reference to the accompanying drawings. However, the present disclosure can be implemented in various manners, and thus should not be construed to be limited solely to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
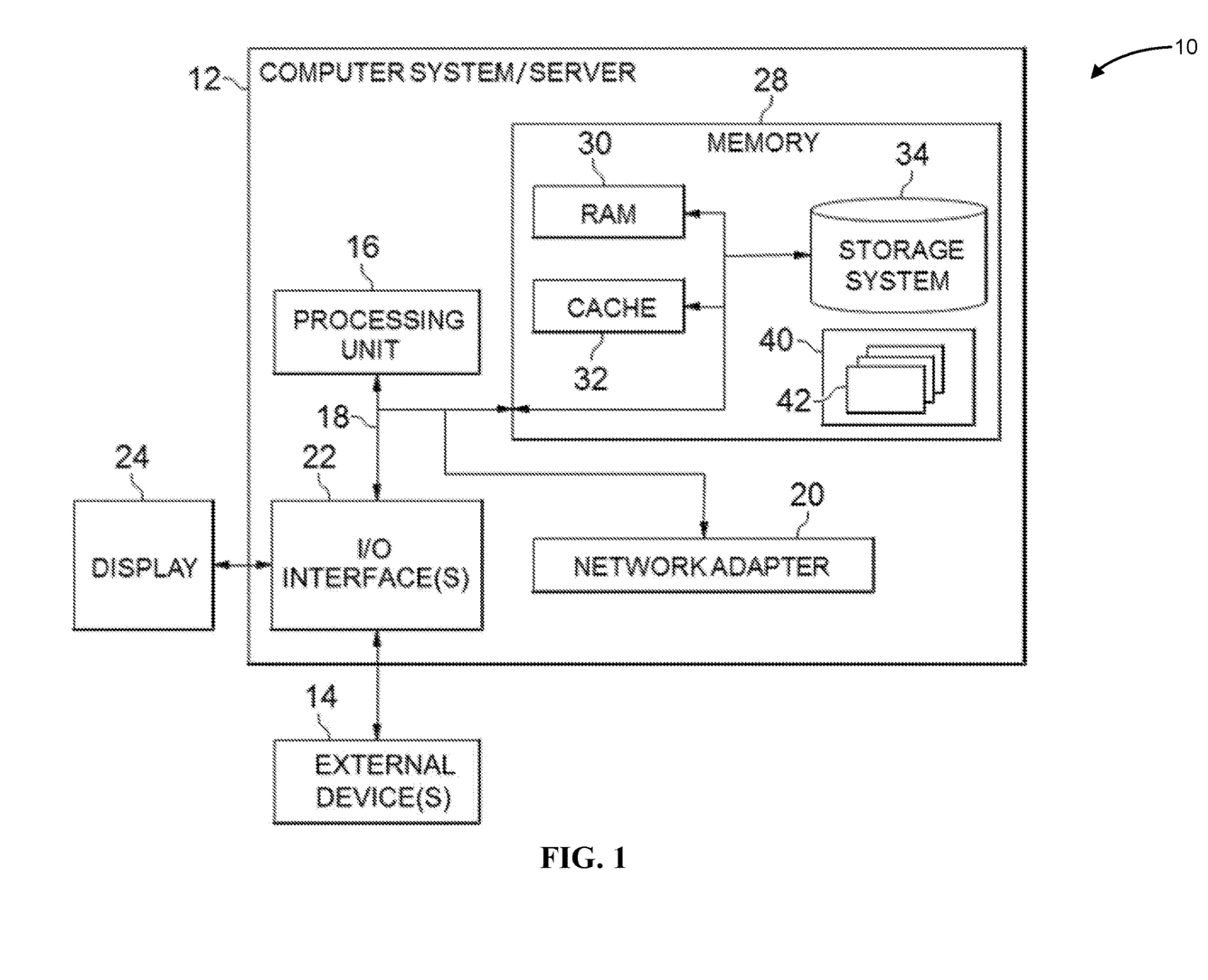
FIG. 1 depicts a cloud computing node, according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12 or a portable electronic device such as a communication device, which is operational with numerous other general purpose or special purpose computing system environments or configurations. Examples of computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, etc.

Figure 2:
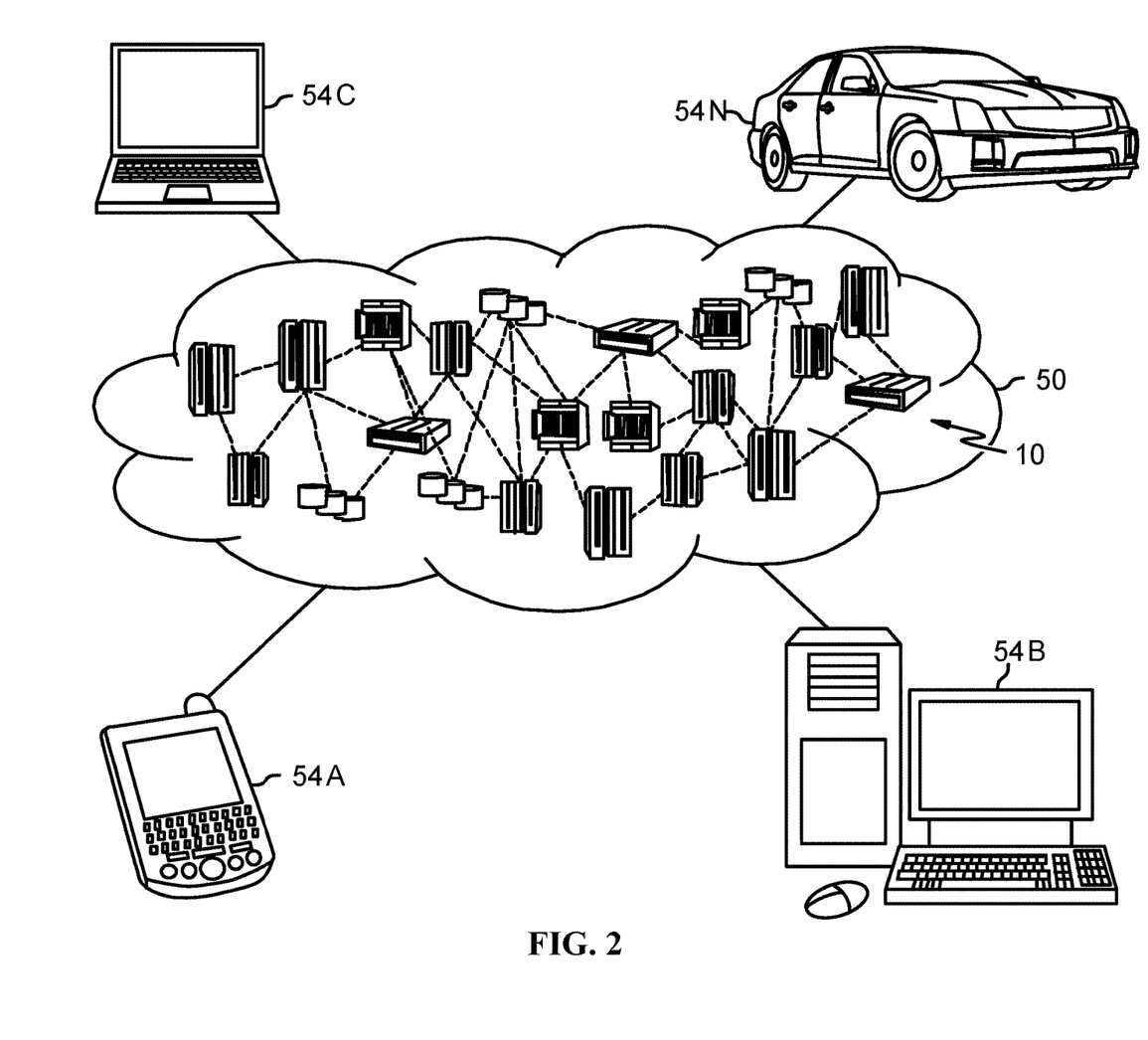
FIG. 2 depicts a cloud computing environment, according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
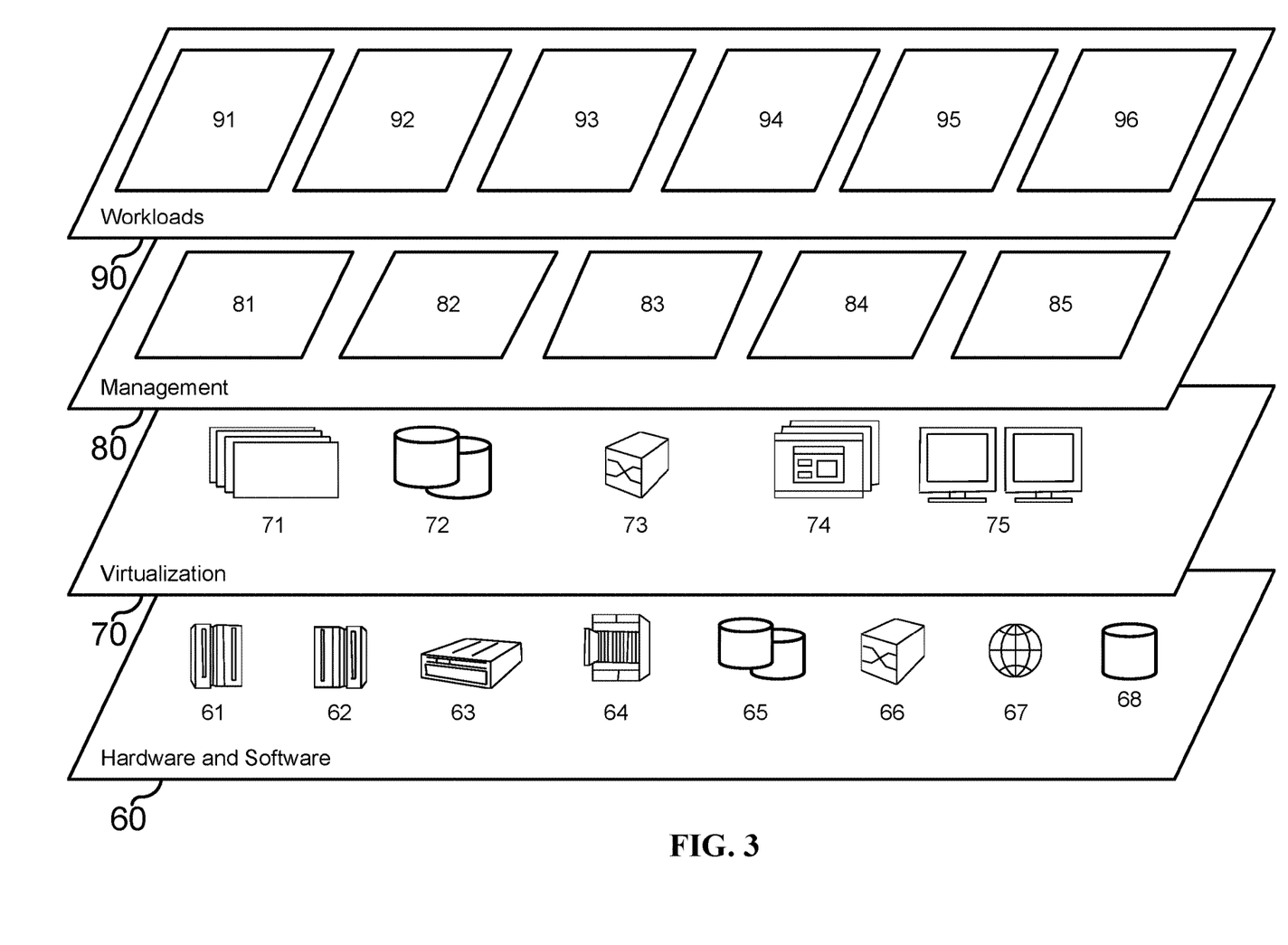
FIG. 3 depicts abstraction model layers, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transmission 96.

Figure 4:
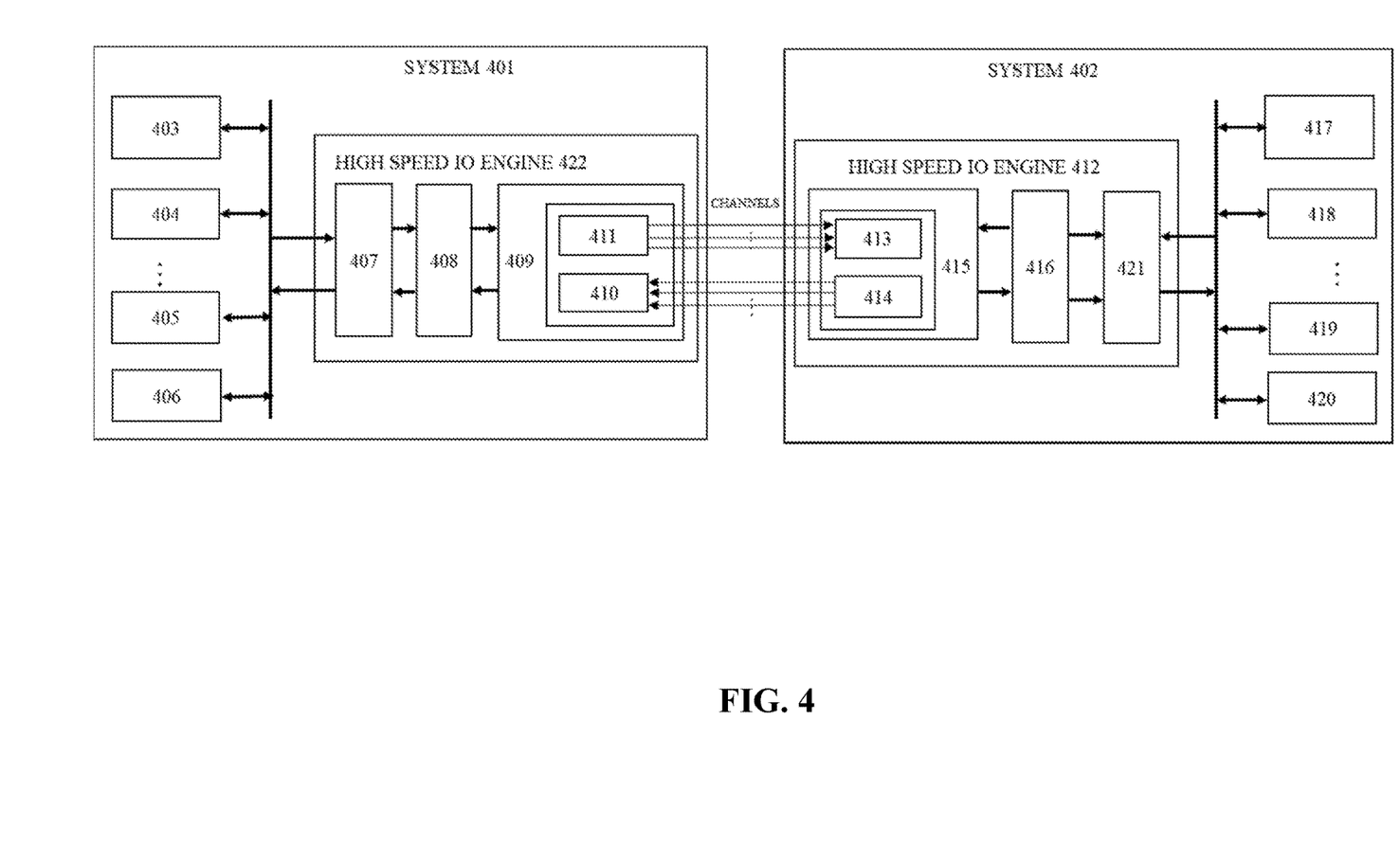
FIG. 4 depicts two systems connected with high-speed IO interfaces, according to an embodiment of the present disclosure.

In general, high-speed IO interfaces are used for high bandwidth/volume data transmission between two systems. The systems can be processor systems, network systems, storage systems, etc. FIG. 4 depicts two systems connected with high-speed IO interfaces, according to an embodiment of the present disclosure. As shown, systems 401 and 402 can communicate with each other through physical channels. Each system comprises respective sub-units which can communicate with each other through, for example, an internal bus. The sub-units of system 401 comprise a memory controller 403, Central Processing Unit (CPU) cores 404 and 405, a high-speed IO engine 422 and other functional engines 406. The sub-units of system 402 comprise a memory controller 417, CPU cores 418 and 419, a high-speed IO engine 412 and other functional engines 420. High-speed IO engines 422 and 412 can receive data from each other through the physical channels, then deliver the data to a target sub-unit by the internal bus.

High-speed IO engines 422 and 412 may have three communication protocol layers: transaction layers 407 and 421, data link layers 408 and 416, and physical layers 409 and 415. Transaction layers 407 and 421 can transfer internal bus commands to data link layers 408 and 416, and also can receive responses from the data link layers. Data link layers 408 and 416 can provide reliable and efficient communication by proper encoding and error checking mechanisms. Physical layers 409 and 415 define ways of transmitting raw bits between high-speed IO engines 422 and 412, which can provide electrical, mechanical, and procedural interfaces to transmission media. Physical layer 409 comprises a transmitter 411 and a receiver 410, and physical layer 415 comprises a transmitter 414 and a receiver 413. Transmitters 411 and 414 can serialize parallel data from data link layers 408 and 416 and scramble the serial bit stream. Receivers 410 and 413 are modules of physical layers 409 and 415, and they are responsible for recovering a correct bit stream from degraded channel signals caused by time dispersions, reflections, undesired environmental condition fluctuations, etc., and then de-serializing the correct bit stream to parallel data to the data link layers. To ensure high-quality data integrity and uninterrupted data transmission, real-time calibration is employed by high-speed IO designs through compensation for misalignment resulting from channel or environmental changing.

A receiver comprises a plurality of optimization modules which are under the control of a calibration logic. The calibration logic comprises a plurality of calibration stages, each of which can provide a valid control code for a corresponding optimization module of a plurality of optimization modules. If all calibration stages in a channel have been finished, the whole calibration process is referred as one calibration cycle for this channel After optimization, the degraded channel signal is recovered to a channel signal which is substantially similar to the original signal on the transmitter side. The calibration logic is unchangeable, and performs the calibration for the optimization modules stage-by-stage during calibration process. Therefore, this may require high power consumption and time costs.

It would be desirable to provide a more flexible calibration procedure which can realize power saving to compensate the misalignment caused by channel or environmental changes.

The present disclosure provides a flexible calibration mechanism for a receiver with high-speed IO interface. To ensure high-quality data integrity and uninterrupted data transmission, real-time calibration is employed by high-speed IO designs through compensation for misalignment caused by channel or environmental changes.

During the process of data transmission, historical calibration data for each calibration stage can be used to analyze characteristics for the calibration stage in a channel during a particular period of time. The calibration logic can be adjusted in the one or more subsequent calibration cycles, based on the characteristics.

Figure 5:
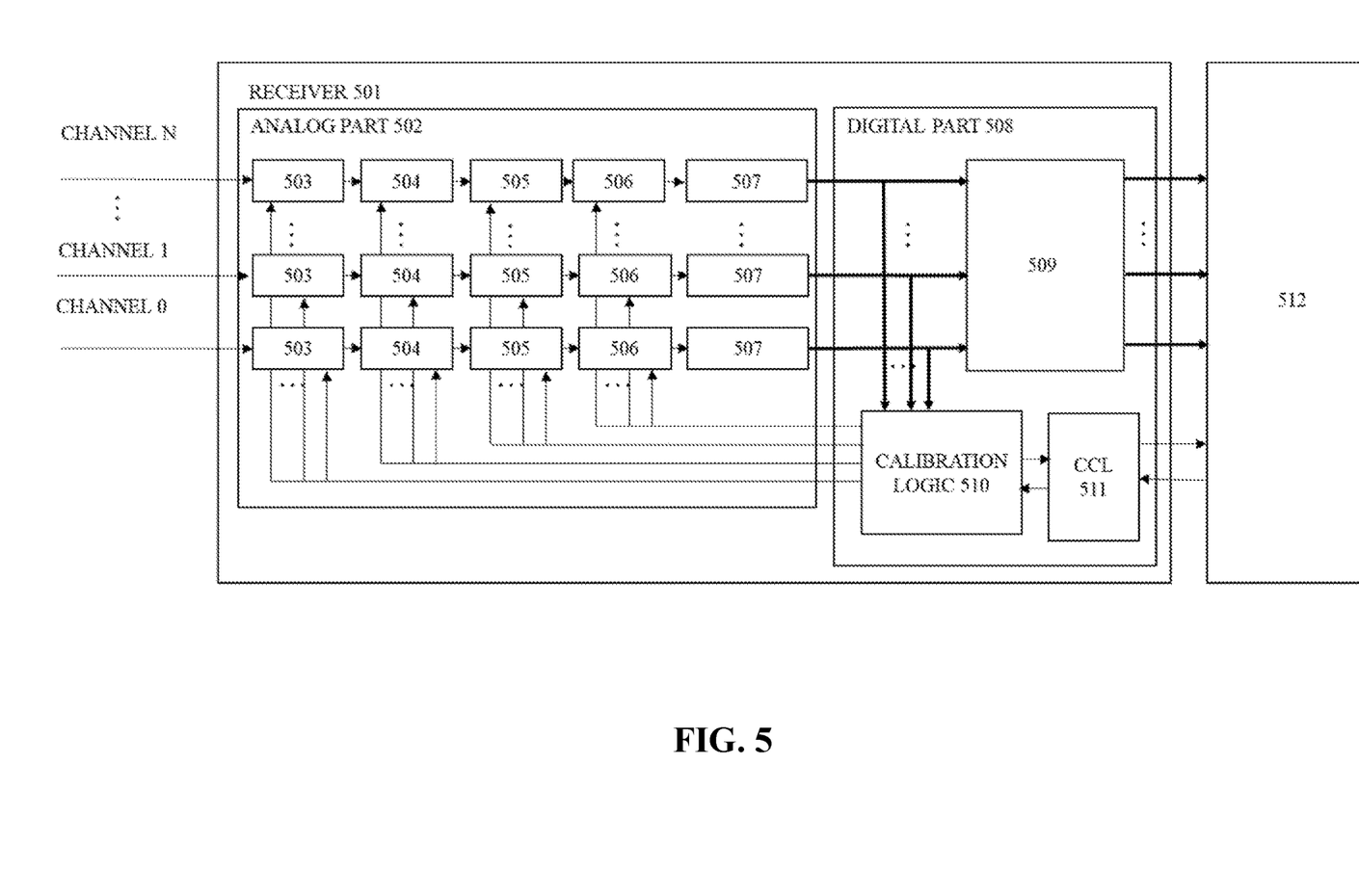
FIG. 5 depicts a receiver structure in which the present disclosure can be implemented, according to an embodiment of the present disclosure.

FIG. 5 depicts a receiver structure in which the present disclosure can be implemented, according to an embodiment of the present disclosure. The receiver 501 comprises an analog part 502 and a digital part 508. Analog part 502 comprises multiple sets of modules, each of which corresponds to a channel (e.g., channel 0, channel 1, channel N). A set of modules corresponding to a channel comprise a plurality of optimization modules which are under control of a calibration logic 510 in the digital part 508. The plurality of optimization modules comprise a Continuous Time Linear Equalization (CTLE) 503, a Variable Gain Amplifier (VGA) 504 and a Decision Feedback Equalization (DFE) 505. CTLE 503 is used to optimize the high frequency gain to sharpen the edge of signal transition. VGA 504 is to optimize the gain on the full frequency range of the receiver. The time dispersion is one source of the channel degradation. In the high-speed IO area, it can be interpreted as Inter Symbol Interference (ISI). DFE 505 can cancel out or reduce the ISI. A set of modules for a channel also comprise a sample latch 506 and a deserializer 507.

After optimization, the degraded channel signal is recovered to obtain a recovered channel signal which is substantially similar to the original signal on the transmitter side. The recovered channel signal is sent to a sample latch 506. Then the sampled bit stream is de-serialized by deserializer 507 to parallel data for digital part 508. Digital part 508 comprises a data processor 509, a calibration logic 510 and calibration control logic (CCL) 511. Calibration logic 510 comprises a plurality of calibration stages, each of which can provide calibration for a corresponding optimization module in analog part 502. In digital part 508, the parallel data will be processed by data processor 509 to meet the requirement of data link layer 512, such as data bit alignment. Calibration logic 510 in digital part 508 ensures that the optimization modules work well under degrading channel and changing environment. Calibration logic 510 can manipulate the optimization modules stage by stage and channel by channel during the calibration process. According to an embodiment of the present disclosure, CCL 511 can provide controlling for each calibration stage of calibration logic 510.

Figure 6:
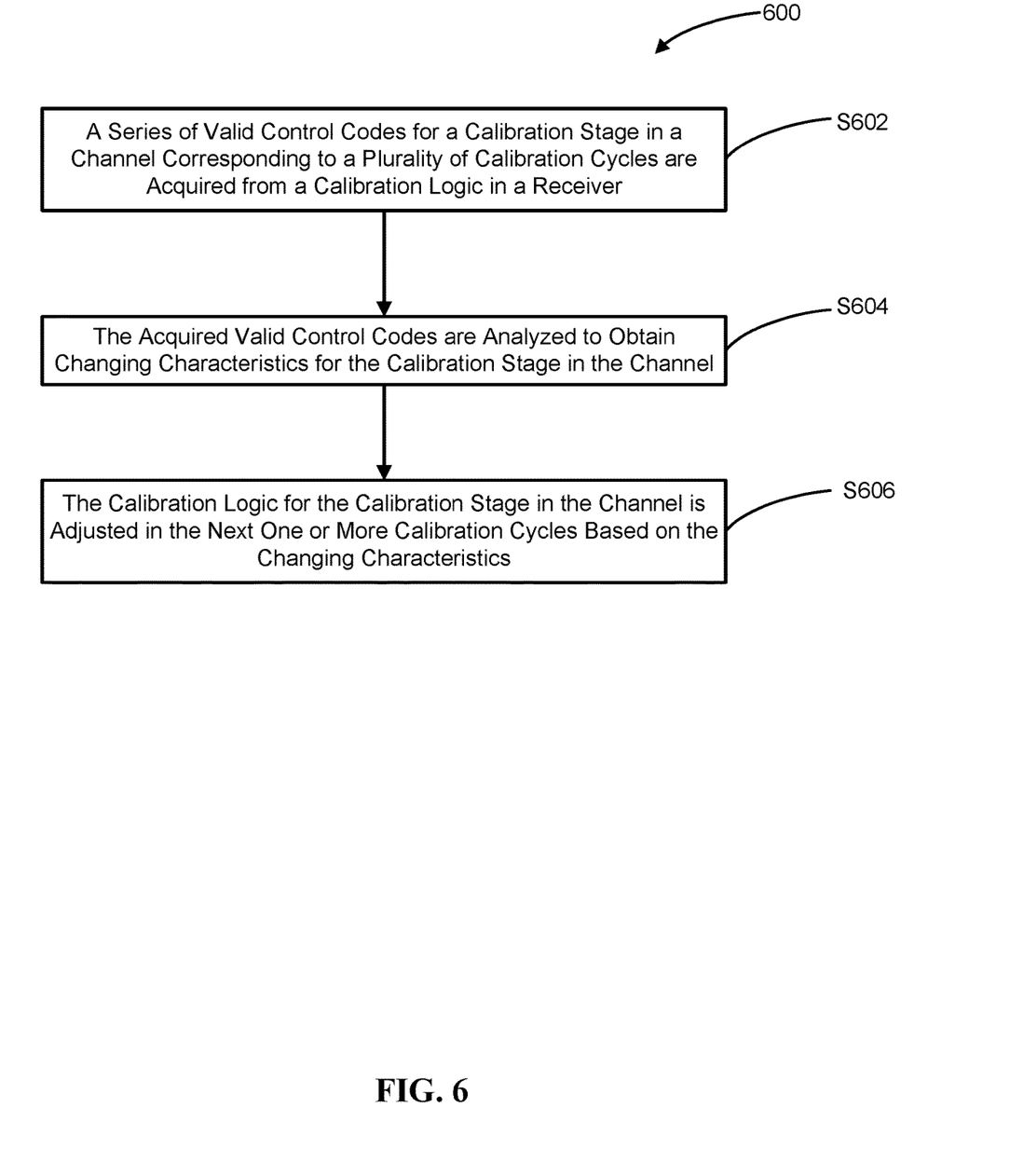
FIG. 6 depicts an exemplary calibration method for a receiver with high-speed IO interfaces, according to an embodiment of the present disclosure.

FIG. 6 depicts an exemplary calibration method 600 for a receiver with high-speed IO interfaces, according to an embodiment of the present disclosure. The receiver comprises a plurality of optimization modules and a calibration logic. The calibration logic for each calibration stage can implement calibration for a corresponding optimization module of the plurality of optimization modules. The receiver further comprises a CCL which can provide calibration control for each calibration stage of the calibration logic. As depicted in Step 602, a series of valid control codes for a calibration stage in a channel corresponding to a plurality of calibration cycles are acquired from the calibration logic. In Step 604, the acquired valid control codes are analyzed to obtain changing characteristics for the calibration stage in the channel. In Step 606, the calibration logic for the calibration stage in the channel is adjusted in one or more subsequent calibration cycles, based on the changing characteristics. According to an embodiment of the present disclosure, Steps 602-606 can be implemented in the CCL.

In each calibration cycle for a channel, the calibration logic for each calibration stage works with the following four steps: In step 1, an initial control code is set and then is sent to a corresponding optimization module; in step 2, the parallel data is received from the analog part as sample data for a certain period of time, then a data error ratio is computed by comparing the sample data with the expected data; in step 3, if the data error ratio is within the predefined threshold, the initial control code is retained; in step 4, if the data error ratio is not within the predefined threshold, then the initial control code is increased or decreased and then the process goes back to Step 2. The loop between step 2 and step 4 will continue until the data error ratio can be controlled within the predefined threshold. A convergence process that starts with discrepancy between the sample data and the expected data ends with a valid control code for the optimization module. The convergence process can be controlled by a time constant. If all calibration stages in a channel have been finished, a calibration cycle for this channel has been completed. In each calibration cycle, a series of valid control codes for a plurality of calibration stages in one channel can be generated for the calibration of the optimization modules in analog part 502. These valid control codes for a calibration stage in a channel corresponding to a plurality of calibration cycles during a period of time can be recorded by calibration logic 510, for example ($V_1$, $V_2 \ldots V_i$), wherein i indicates a total of i calibration cycles during a period of time, and $V_i$ represents the valid control code for the $i^{th}$ calibration cycle. According to an embodiment of the present disclosure, the calibration logic for each calibration stage in a channel can be adjusted based on the changing characteristics for the calibration stage in the channel.

According to an embodiment of the present disclosure, the changing characteristics for the calibration stage in the channel comprises at least one of stability and the deviation tendency for the calibration stage for the channel According to an embodiment of the present disclosure, the stability for each calibration stage in a channel can be estimated based on the peak-peak value of the valid control codes during a particular period of time (e.g., one hour ago, two hours ago, etc.). At first, in response to completion of a current calibration cycle, the valid control codes of a calibration stage in a channel during a period of time are acquired (e.g., $V_1$, $V_2 \ldots V_i$ wherein i represents a total of i calibration cycles during a period of time, and $V_i$ represents the valid control code for the $i^{th}$ calibration cycle). For example, the stability for a calibration stage in the channel during the period of time can be represented as $(V_{max}-V_{min})$, wherein $V_{max}$ represents the maximum value of the valid control codes $(V_1, V_2 \ldots V_i)$, and $V_{min}$ represents the minimum value of the valid control codes $(V_1, V_2 \ldots V_i)$. According to an embodiment of the present disclosure, the deviation tendency for the calibration stage in the channel can be estimated based on the mean value of the valid control codes during a period of time. For example, the deviation tendency for the calibration stage in the channel during a period of time can be represented as $(V_1+V_2 \ldots V_i)/i$, where i indicates a total of i calibration cycles during a particular period of time, and $V_i$ represents the valid control code for the $i^{th}$ calibration cycle.

According to an embodiment of the present disclosure, at least one control signal for controlling the calibration logic for a calibration stage in a channel in the next one or more calibration cycles can be generated based on the stability and the deviation tendency for the calibration stage in the channel during the period of time by the calibration control logic. According to an embodiment of the present disclosure, whether quality degradation for a stage in a channel occurs or not can be determined based on the stability and/or the deviation tendency. If the determining result indicates no quality degradation for the calibration stage in the channel, a first control signal is generated for controlling the calibration logic for the calibration stage in the channel to keep the current valid control code unchanged for the calibration stage in the channel in the subsequent calibration cycle(s). If the result indicates quality degradation for the calibration stage in the channel, a second control signal is generated for controlling the calibration logic for the calibration stage in the channel to generate a new valid control code in one or more subsequent calibration cycle(s). According to the above embodiments of the present disclosure, the calibration logic for the calibration stage in a channel does not necessarily need to generate a valid control code for each calibration stage. Therefore, the time period of a calibration cycle can be shortened, which can save power consumption and save time for data transmission.

According to an embodiment of the present disclosure, whether quality degradation for a stage in a channel occurs or not can be determined based on equation (1):

$$Q=w_1*S+w_2*T; \qquad (1)$$

In equation (1), Q represents a quality indicator for a calibration stage in a channel during a particular period of time, S represents the stability for the calibration stage in the channel during the particular period of time, T represents the deviation tendency for the calibration stage in the channel during the particular period of time, $w_1$ represents a weight assigned to the stability for the calibration stage in the channel during the particular period of time, and $w_2$ represents a weight assigned to the deviation tendency for the calibration stage in the channel during the particular period of time. The weights may be assigned empirically.

According to an embodiment of the present disclosure, the quality indicator Q can be compared with a predefined threshold to determine whether the quality of the channel is degraded, based on the comparison result.

According to an embodiment of the present disclosure, the first control signal comprises a certain number, and the first control signal is used for controlling the calibration logic for the calibration stage in the channel to keep the current valid control code unchanged for the calibration stage in the channel in the next certain number of calibration cycles.

According to an embodiment of the present disclosure, the second control signal comprises a time constant, and the second control signal is used for controlling a time period for generating the new valid control code for the calibration stage in the channel in the next calibration cycle. The convergence process between step 2 and step 4 for a calibration stage in a channel can be fixed by the time constant.

The above quality estimation methods based on the stability and the deviation tendency for a calibration stage in a channel during the period of time can be implemented in various manners. Above embodiments are only exemplary, but not exhaustive, and thus should not be construed to limit the potential embodiments of the disclosure.

In the calibration logic, a fixed interval between two successive calibration cycles for a channel can be controlled by a timer. According to an embodiment of the present disclosure, a timer of the calibration logic can be controlled by the CCL, so the fixed interval between two successive calibration cycles for a channel can be adjusted by the CCL. According to the method, in response to the completion of the current calibration cycle, a Bit Error Rate (BER) and eye diagram information for sample data over the channel are acquired by the CCL. The BER for the sample data can be acquired from a data error detection logic of the data link layer. The eye diagram may be a waveform display in which a digital signal from a receiver is repetitively sampled and applied to the vertical input, while the data rate is used to trigger the horizontal sweep. Amplitude measurements of the eye diagram comprise eye height and eye width, wherein the eye height measures additive noise in the signal and the eye width measures timing synchronization & jitter effects. Distortion of the signal waveform due to intersymbol interference and noise may appear as closure of the eye pattern. The measurements of the eye height and eye width for sample data over the channel can be implemented by the calibration logic, so the eye height and eye width for sample data over the channel can be acquired from the calibration logic. According to an embodiment of the present disclosure, the interval between the current calibration cycle and the next calibration cycle for the channel can be adjusted by the CCL based on the BER and the eye diagram information.

Figure 7:
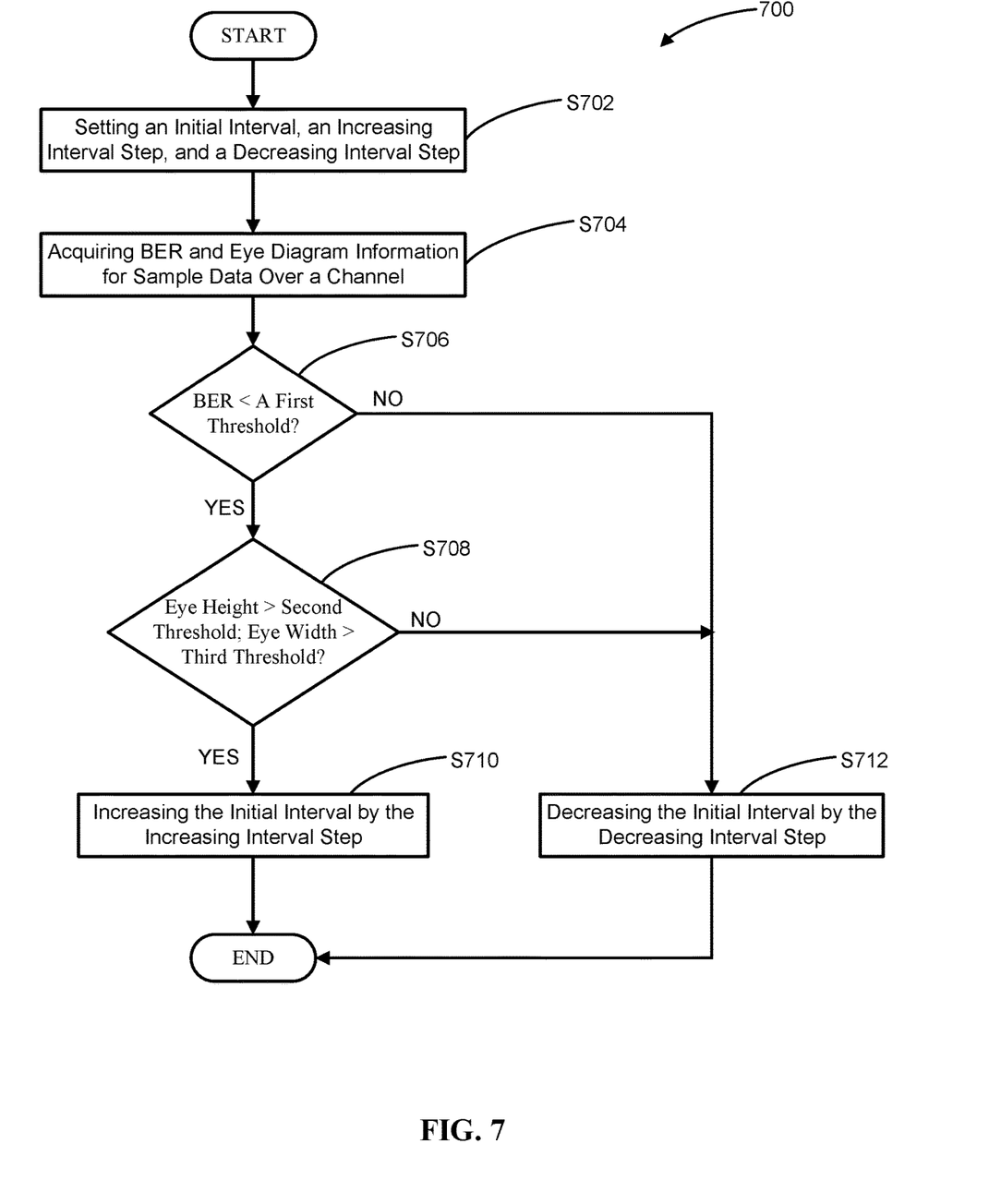
FIG. 7 depicts an exemplary method for adjusting the interval between two successive calibration cycles for a channel, according to an embodiment of the present disclosure.

FIG. 7 depicts an exemplary method 700 for adjusting the interval between two successive calibration cycles for a channel in the calibration logic according to an embodiment of the present disclosure. According to the method, in Step 702, an initial interval, an increasing interval step, and a decreasing interval step are set. In Step 704, in response to the completion of the current calibration cycle of the channel, the EBR and the eye diagram information for the sample data over the channel are acquired. In Step 706, it is determined whether BER is less than a predefined first threshold. If the result of determination in Step 706 is No, then the process goes to Step 712. If the result of determination in Step 706 is Yes, then the process goes to Step 708, where it is determined whether the eye height is greater than a predefined second threshold and the eye width is greater than a predefined third threshold. If the result of determination in Step 708 is No, then the process goes to Step 712. If the result of determination in Step 708 is Yes, then the process goes to Step 710. A first timer controlling signal for the calibration logic can be generated to increase the interval between the current calibration cycle and the next calibration cycle for the channel by the increasing interval step; then the process ends. In Step 712, a second timer controlling signal for the calibration logic can be generated to decrease the interval between the current calibration cycle and the next calibration cycle for the channel by the decreasing interval step, then the process ends. According to an embodiment of present disclosure, the timer of the calibration logic can be controlled by the first timer controlling signal and the second timer controlling signal, so the interval between two successive calibration cycles for the channel can be increased or be decreased when the conditions are met. With the present method, the fixed interval between two successive calibration cycles in a channel can be dynamically adjusted to an optimized interval, which can lower the power consumption during the whole calibration process. According to an embodiment of present disclosure, Steps 702-712 can be implemented by the CCL.

It should be noted, in the calibration logic, the adjustment of each calibration stage in a channel and the adjustment of the interval between two successive calibration cycles can be performed in a preset order or in parallel. Any sequence or order of steps that may be described herein does not necessarily indicate a requirement that the steps be performed in that order. The steps of processes described herein may be performed in any practical order.

Various embodiments for implementing the methods of the present disclosure have been described above with reference to accompanying drawings. Those skilled in the art will appreciate that the above methods may be implemented in software, hardware, or a combination thereof. According to an embodiment of present disclosure, the CCL can be implemented in one or more processing units of a receiver.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   acquiring, by one or more processing units, a series of valid control codes for a calibration stage in a channel corresponding to a plurality of calibration cycles from a calibration logic in a receiver;
   analyzing, by one or more processing units, the series of valid control codes to obtain changing characteristics for the calibration stage in the channel, wherein the changing characteristics comprise at least one characteristic selected from a group consisting of: a stability for the calibration stage in the channel, and a deviation tendency for the calibration stage in the channel;
   adjusting, by one or more processing units, the calibration logic for the calibration stage in the channel in one or more subsequent calibration cycles, by generating, using one or more processing units, a first control signal for controlling the calibration logic for the calibration stage in the channel in one or more subsequent calibration cycles, based on the changing characteristics;
   wherein the first control signal comprises a certain number, and the first control signal is used for controlling the calibration logic for the calibration stage in the channel to keep a current valid control code unchanged for the calibration stage in the channel in a subsequent number of calibration cycles; and
   wherein generating the first control signal further comprises:
   in response to determining that quality degradation for the calibration stage in the channel occurs, based on the changing characteristics, generating, by one or more processing units, a second control signal for controlling the calibration logic for the calibration stage in the channel to generate a new valid control code for the calibration stage in the channel in the one or more subsequent calibration cycles.

2. The method of claim 1, wherein the second control signal comprises a time constant, and the second control signal is used for, based on the time constant, controlling a time period for generating the new valid control code for the calibration stage in the channel in a next calibration cycle.

3. The method of claim 1, further comprising:
   in response to the completion of a current calibration cycle, acquiring, by one or more processing units, a Bit Error Rate (BER) and eye diagram information for sample data over the channel; and
   adjusting, by one or more processing units, an interval between the current calibration cycle and a next calibration cycle for the channel in the calibration logic, based on the BER and the eye diagram information.

4. The method of claim 3, wherein the eye diagram information comprises an eye height and an eye width, and wherein the adjusting an interval between the current calibration cycle and the next calibration cycle for the channel in the calibration logic according to the BER and the eye diagram information further comprises:
   in response to the BER being less than a first threshold and the eye height being greater than a second threshold and the eye width being greater than a third threshold, generating, by one or more processing units, a first timer controlling signal for the calibration logic to increase the interval between the current calibration cycle and the next calibration cycle for the channel.

5. A computer system comprising:
   one or more processing units;
   a memory coupled to the one or more processing units, wherein the memory comprises program instructions that when executed by the one or more processing units implements a method comprising:
   acquiring a series of valid control codes for a calibration stage in a channel corresponding to a plurality of calibration cycles from a calibration logic in a receiver;
   analyzing the series of valid control codes to obtain changing characteristics for the calibration stage in the channel, wherein the changing characteristics comprise at least one characteristic selected from a group consisting of: a stability for the calibration stage in the channel, and a deviation tendency for the calibration stage in the channel;
   adjusting the calibration logic for the calibration stage in the channel in one or more subsequent calibration cycles, by generating, using one or more processing units, a first control signal for controlling the calibration logic for the calibration stage in the channel in one or more subsequent calibration cycles, based on the changing characteristics;

wherein the first control signal comprises a certain number, and the first control signal is used for controlling the calibration logic for the calibration stage in the channel to keep a current valid control code unchanged for the calibration stage in the channel in a subsequent number of calibration cycles; and wherein generating the first control signal further comprises:

in response to determining that quality degradation for the calibration stage in the channel occurs, based on the changing characteristics, generating, by one or more processing units, a second control signal for controlling the calibration logic for the calibration stage in the channel to generate a new valid control code for the calibration stage in the channel in the one or more subsequent calibration cycles.

6. The computer system of claim 5, wherein the second control signal comprises a time constant, and wherein the second control signal is used for, based on the time constant, controlling a time period for generating the new valid control code for the calibration stage in the channel in a next calibration cycle.

7. The computer system of claim 5, the method further comprising:

in response to the completion of a current calibration cycle, acquiring a Bit Error Rate (BER) and eye diagram information for sample data over the channel; and adjusting an interval between the current calibration cycle and a next calibration cycle for the channel in the calibration logic based on the BER and the eye diagram information.

8. The computer system of claim 7, wherein the eye diagram information comprises an eye height and an eye width, wherein the adjusting an interval between the current calibration cycle and the next calibration cycle for the channel in the calibration logic according to the BER and the eye diagram information further comprises:

in response to the BER being less than a first threshold and the eye height being greater than a second threshold and the eye width being greater than a third threshold, generating a first timer controlling signal for the calibration logic to increase the interval between the current calibration cycle and the next calibration cycle for the channel.

9. A computer program product comprising a computer readable storage medium having program instructions embodied therewith, the program instructions executable by a processor to cause the processor to perform actions of:

acquiring a series of valid control codes for a calibration stage in a channel corresponding to a plurality of calibration cycles from a calibration logic in a receiver;

analyzing the series of valid control codes to obtain changing characteristics for the calibration stage in the channel, wherein the changing characteristics comprise at least one characteristic selected from a group consisting of: a stability for the calibration stage in the channel, and a deviation tendency for the calibration stage in the channel;

adjusting the calibration logic for the calibration stage in the channel in one or more subsequent calibration cycles, by generating, using one or more processing units, a first control signal for controlling the calibration logic for the calibration stage in the channel in one or more subsequent calibration cycles, based on the changing characteristics;

wherein the first control signal comprises a certain number, and the first control signal is used for controlling the calibration logic for the calibration stage in the channel to keep a current valid control code unchanged for the calibration stage in the channel in a subsequent number of calibration cycles; and wherein generating the first control signal further comprises:

in response to determining that quality degradation for the calibration stage in the channel occurs, based on the changing characteristics, generating, by one or more processing units, a second control signal for controlling the calibration logic for the calibration stage in the channel to generate a new valid control code for the calibration stage in the channel in the one or more subsequent calibration cycles.

10. The computer program product of claim 9, wherein the generating the at least one control signal for controlling the calibration logic further comprises:

in response to the completion of a current calibration cycle, acquiring a Bit Error Rate (BER) and eye diagram information for sample data over the channel; and adjusting an interval between the current calibration cycle and a next calibration cycle for the channel in the calibration logic based on the BER and the eye diagram information.

* * * * *